(12) United States Patent
Dyball

(10) Patent No.: US 9,830,332 B1
(45) Date of Patent: Nov. 28, 2017

(54) FILE-ATTENDANT MESSAGING

(71) Applicant: Green Room Networks, Inc., San Francisco, CA (US)

(72) Inventor: Christopher Dyball, San Francisco, CA (US)

(73) Assignee: Green Room Networks, Inc., Menlo Park, CA (US)

( * ) Notice: Subject to any disclaimer, the term of this patent is extended or adjusted under 35 U.S.C. 154(b) by 168 days.

(21) Appl. No.: 14/961,682

(22) Filed: Dec. 7, 2015

Related U.S. Application Data

(63) Continuation of application No. 13/944,484, filed on Jul. 17, 2013, now Pat. No. 9,237,119.

(60) Provisional application No. 61/672,292, filed on Jul. 17, 2012.

(51) Int. Cl.

| | | |
|---|---|---|
| *G06F 17/00* | (2006.01) | |
| *G06F 17/30* | (2006.01) | |
| *H04L 29/08* | (2006.01) | |
| *H04L 12/58* | (2006.01) | |
| *G06F 3/0484* | (2013.01) | |
| *G06F 3/0483* | (2013.01) | |

(52) U.S. Cl.
CPC ...... *G06F 17/30174* (2013.01); *G06F 3/0483* (2013.01); *G06F 3/0484* (2013.01); *G06F 17/30312* (2013.01); *G06F 17/30386* (2013.01); *H04L 51/046* (2013.01); *H04L 67/1095* (2013.01)

(58) Field of Classification Search
None
See application file for complete search history.

(56) References Cited

U.S. PATENT DOCUMENTS

| | | |
|---|---|---|
| 7,089,530 B1 | 8/2006 | Dardinski et al. |
| 8,667,273 B1 | 3/2014 | Billstrom et al. |
| 9,697,212 B2 * | 7/2017 | Krig ................. G06F 17/30076 |
| 2003/0154238 A1 | 8/2003 | Murphy et al. |
| 2008/0010601 A1 | 1/2008 | Dachs |
| 2009/0210454 A1 | 8/2009 | Sagar et al. |
| 2013/0226872 A1 | 8/2013 | Barefoot et al. |
| 2013/0282658 A1 * | 10/2013 | Besen ............... G06F 17/30215 707/634 |
| 2016/0026704 A1 * | 1/2016 | Strong .............. G06F 17/30038 707/624 |
| 2016/0072841 A1 * | 3/2016 | Caporal ................ G06F 3/0482 726/1 |

\* cited by examiner

*Primary Examiner* — Kenny Lin
(74) *Attorney, Agent, or Firm* — Charles Shemwell

(57) ABSTRACT

In response to detecting data file creation/revision in a first computing device, one or more other computing devices in which the data file creation/revision is to be synchronized are identified and a user of the first computing device is prompted to specify a message to be communicated to the one or more other computing devices in association with the data file creation/revision. The message specified by the user of the first computing device is received and communicated to the one or more other computing devices together with information that enables the data file creation/revision to be synchronized within the one or more other computing devices.

20 Claims, 5 Drawing Sheets

FILE-ATTENDANT MESSAGING

TECHNICAL FIELD

The disclosure herein relates to communications in resource sharing systems, and more particularly to collaborative messaging between users with respect to files or other shared resources.

BACKGROUND

Increasing employee mobility and rising capabilities of end-user systems have spawned a proliferating number of Internet-based ("cloud") storage systems such as Dropbox, Google Drive, iCloud, and Microsoft SkyDrive, to name a few. Generally speaking, such storage systems operate as massive file synchronization schemes, detecting changes in one instance of a "cloud-based" file and propagating those changes automatically to all other instances of that file, thus ensuring that all users have access to the latest version of the file.

Despite the collaborative advantages of cloud-based storage systems, the manner of user communications with respect to newly created or revised files remains largely unchanged. E-mail threads, phone messages and text messages abound as users communicate with one another regarding changes or creation of files of interest. Indeed, when faced with determining the status of a file or actions required, many users first resort to an e-mail search in an effort to extract the various messages relating to a given file or set of files from a morass of electronic communications. Voicemail messages and text messages are even more problematic, often being long since deleted by the time needed to guide user decisions or actions.

BRIEF DESCRIPTION OF THE DRAWING

The disclosure herein is illustrated by way of example, and not by way of limitation, in the figures of the accompanying drawings and in which like reference numerals refer to similar elements and in which.

DETAILED DESCRIPTION

In various embodiments disclosed herein a user in a file-sharing system is prompted to associated one or more messages with a shared file, with any such messages being conveyed to each other user of the shared file in conjunction with file synchronization communications. That is, recognizing that a fundamental action in a file sharing system is the automatic conveyance of file revisions and file creation actions needed to maintain synchronized instances of a shared file across a network of users, it follows that a natural way to communicate messages with respect to those revision/creation actions is to attach (or associate) messages to files, messages that appear, for example, as pop-up notifications in a desktop application, browser or smartphone application. This is a very different way of looking at collaboration that lines up with the way that users interact with each other and shared data to complete every-day tasks. The result is an intuitive, natural workflow that yields a far superior user-experience in comparison with the more conventional approach of attaching files to messages, sending text messages, etc.

Figure 1:
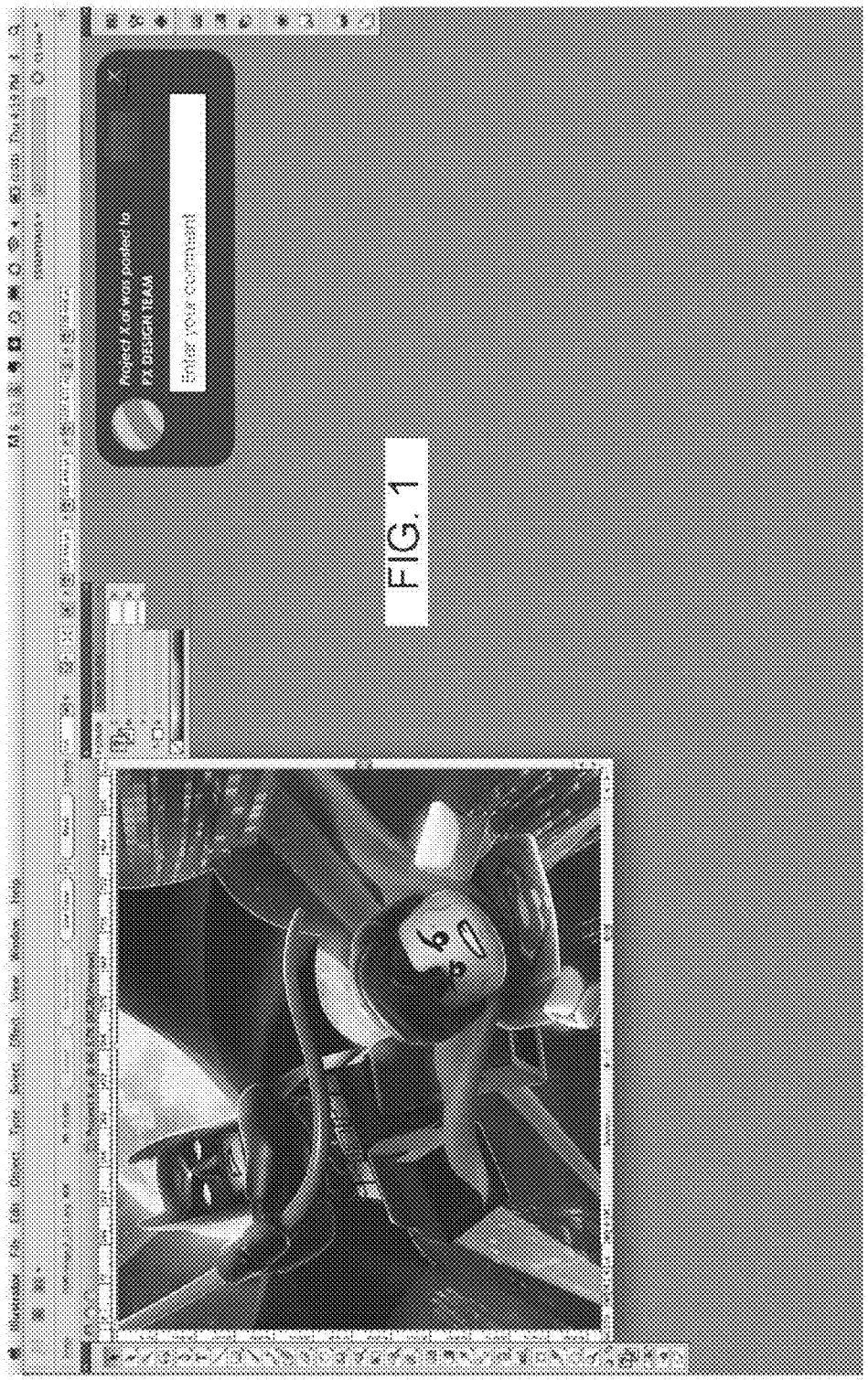
FIG. 1 illustrates a pop-up notification from a file-attendant messaging system according to an embodiment disclosed herein.

In one embodiment, a user of a file-attendant messaging system is prompted, via a browser interface for example, to identify their account within a file sharing system. Upon doing so, the messaging system identifies the user's shared folders and prompts the user to choose which of those folders they would like to "discuss" with others (i.e., for which file-attendant messaging is to be enabled, thus effecting a messaging-enabled folder). After the user chooses a folder to discuss and subsequently saves a file or file revision to that messaging-enabled folder, the messaging system will prompt the user as shown, for example, in FIG. 1 (e.g., in a pop-up notification/prompt such as a Growl notification or a browser-based notification) to enter a comment regarding the newly created file or file revision, a comment that is thereafter "attached" or associated with the file. Upon dispatching the comment (e.g., clicking "done" or "ok" to indicate comment completion), the message is effectively attached to the file and is then communicated (e.g., transmitted over the Internet and/or intranet) to other users having access to the shared file together with information needed to synchronize the file creation or file instantiation operation.

Figure 2:
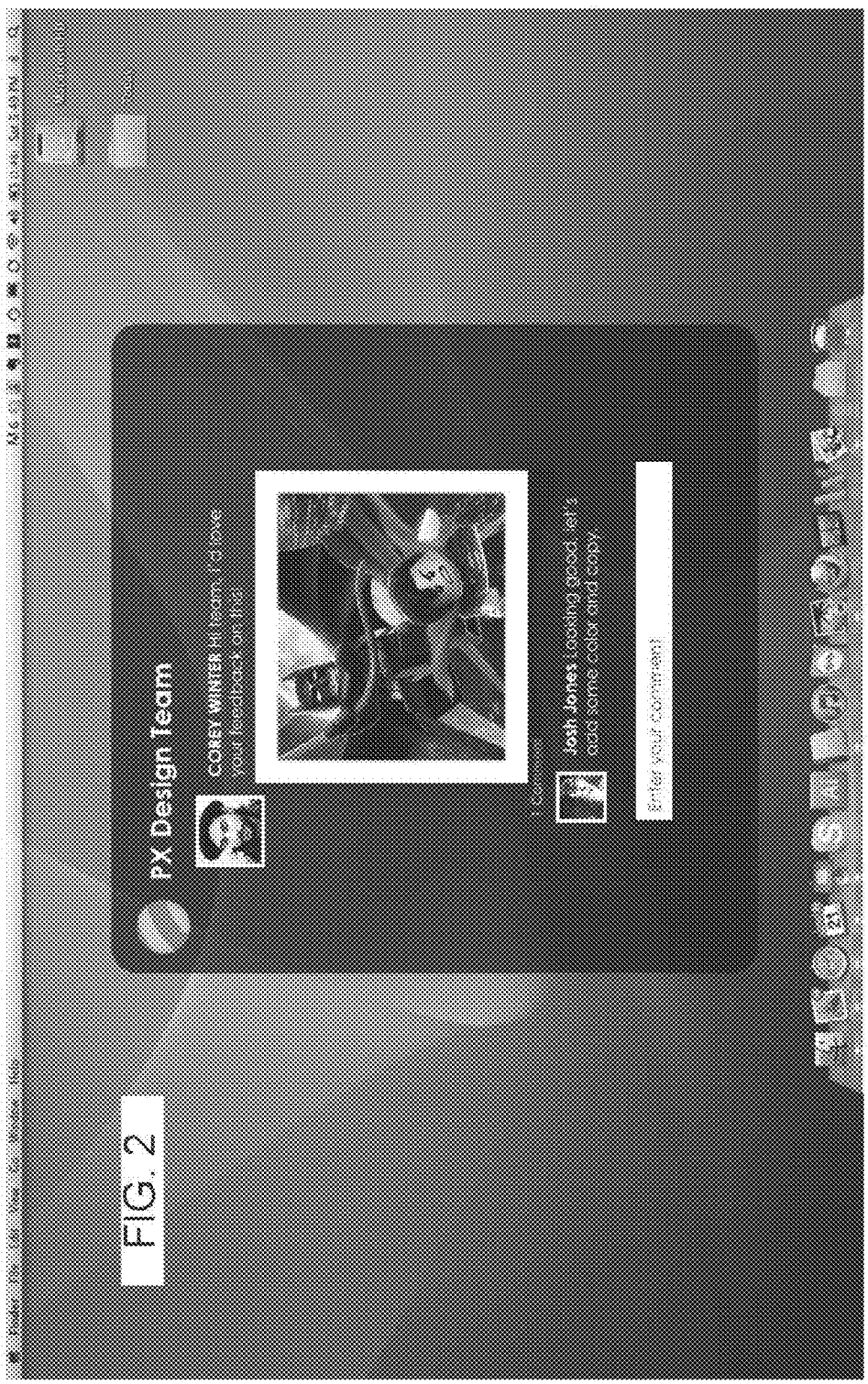
FIG. 2 illustrates an exemplary notification that presents a preview image.

From the user's perspective, being prompted to attach a quick comment and clicking "ok" is a much easier way to convey a message with respect to the file creation/revision action than having to separately create an e-mail message, trying to remember whom to copy (a particularly onerous task when the file-share group grows beyond four or five users) and all the distractions that come with that effort (e.g., being distracted by other e-mail messages, social media feeds, etc.). Instead, the user is able to stay within his or her current workflow, attaching the message as a natural consequence of closing or modifying the file, and getting back to work again. FIG. 2 provides an example of this, in this instance, presenting a preview of an image within a shared file to other users for comment, enabling the sender (Corey) to request feedback, and enabling a recipient to provide a response, all in the context of the preview and with all notifications being generated by a browser or desktop notification. Overall, file-attendant messaging is a tremendous step forward in collaborative data sharing, effecting communications naturally and intuitively in a way that preserves a meaningful and readily available history of file creation and revision.

Figure 3:
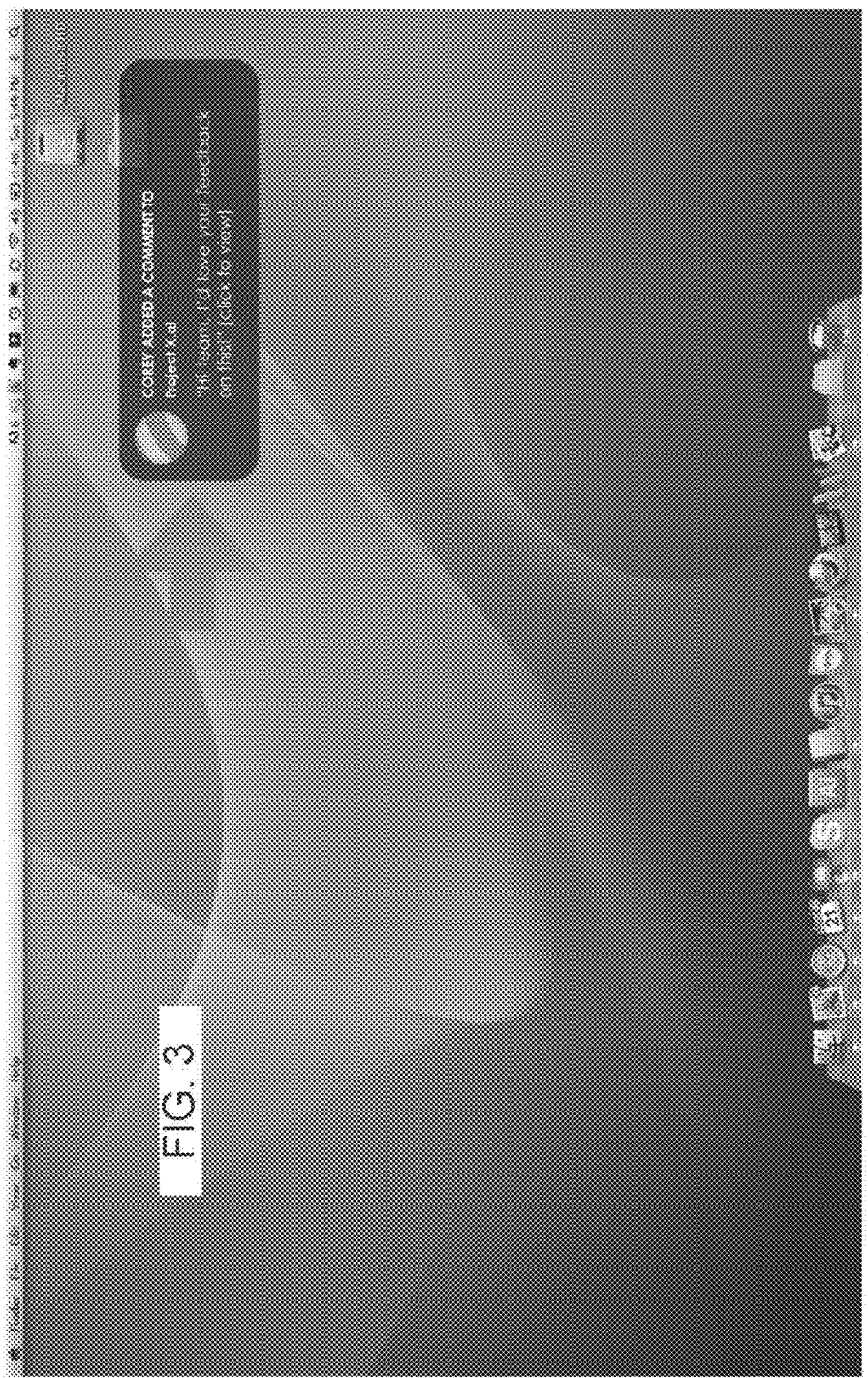
FIG. 3 illustrates a further example of a pop-up notifications that may be presented within a user system or device.

The colleagues and friends that constitute the other users of a revised or created file will receive and be able to view file-attendant messages, for example in pop-up notifications in a browser, desktop application or smartphone application (see, for example, FIG. 3). In the case of a desktop notification or browser notification, the message recipient can click in the notification pop-up to view a larger preview of the revised/created file along-side the attendant message. In the case of a multi-page file (e.g., a pdf document), the user may scroll through the pages of the file and view the different images therein. In one embodiment, the user is not limited to commenting on the file as a whole and instead may comment on each page of the multi-page file. In any case, all such responsive comments are "attached" to the file and conveyed to the user that sourced the original file-attendant message and all other users of the shared file. In one embodiment, users may express messages or comments through page-by-page annotations (i.e., comments that are connected to a particular feature or point in a file).

Various additional features may be layered on top of the file-attendant messaging. For example, the system may embed a watermark or other indication that a user or group of users is actively viewing a file (i.e., has the file open). Consequently, any screenshot of the file as being viewed would bear the watermark of the viewing user, thus indicating the source of any screen shot or print that could be used to provide accountability and deter misuse (e.g., leak or other misappropriation).

A notification having a preview of a message may also be driven as a push notification on a user's smartphone. The message, despite being initiated in response to the file revision, may be output as an e-mail. Other users may then see the message in their e-mail and then just reply by e-mail and so forth. Thus, the message conveyance may be effected in many ways depending on user work styles, but is prompted by user action with respect to the shared file.

Figure 4:
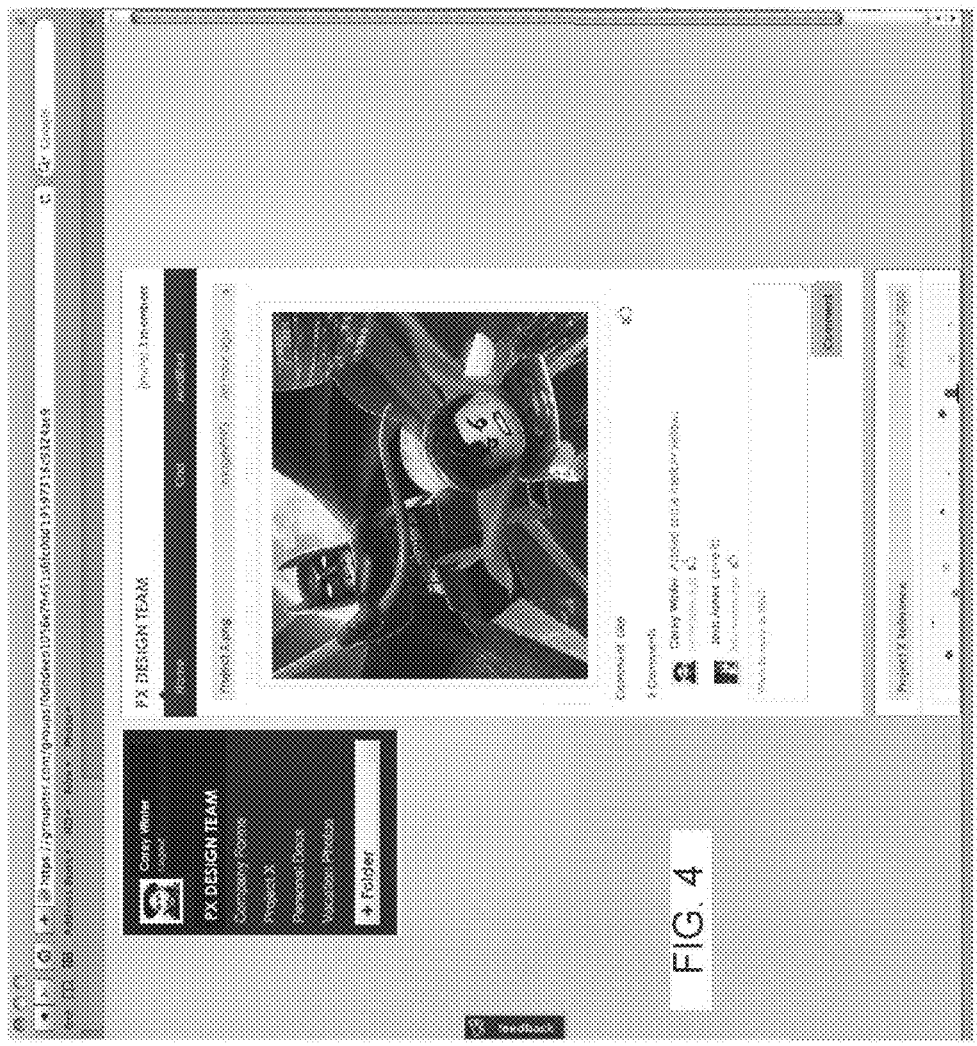
FIG. 4 illustrates an exemplary web page generated by the file-attendant messaging system.

FIG. 4 illustrates a view of a web page generated by the file-attendant messaging system. As shown, the messaging system aggregates all the events and messages associated with a given file and folder so that the file users can see all the different activity within that folder and the various files contained therein. More specifically, the users may see at a glance how the files have been changed over time, when they've been updated, and any notes or these messages that have been created that pertain to these versions over time. Note that the aggregated messages are not limited to those created within the file-attendant messaging system. For example, messages could be received from third party sources with respect to files maintained in various file-sharing systems. For example, if one writes a comment that is attached as a tag or metadata with respect to a file in Google Docs, that comment and any others attached to the file may be accessed (e.g., via an application programming interface) and aggregated within the file-attendant messaging stream.

More generally, any other ways of commenting on files that may be accessed through a programming interface or other port, can be received within the file-attendant messaging system to enable users to collaborate across platforms. Assume in Figure IP.001, for example, that the "PX Design Team" folder owned by a user named "Corey" is a dropbox folder, but that the folder just below is shared with a third party professional (e.g., accountant, attorney, human resources professional, etc.) that uses Google Drive. By aggregating the comments from different sources, the file-attendant messaging system enables Corey, who loves to use dropbox, to collaborate seamlessly and intuitively with his accountant who prefers Google Drive, in one place where they can both keep track of all the conversations around those files regardless of the shared storage that they use. In one embodiment, the file-attendant messaging system may additionally acquire the files that Corey's account has been creating and saving on Google Drive and copy them into Corey's Dropbox so that the files exist in both storage platforms. In such an embodiment, the file-attendant messaging system not only aggregates the comments with respect to the shared files, but effectively becomes a bridge between the different storage platforms.

Note that while the primary data objects described thus far are data files, the messaging techniques disclosed may be applied with respect to virtually any data objects that are shared across a network of users.

Figure 5:
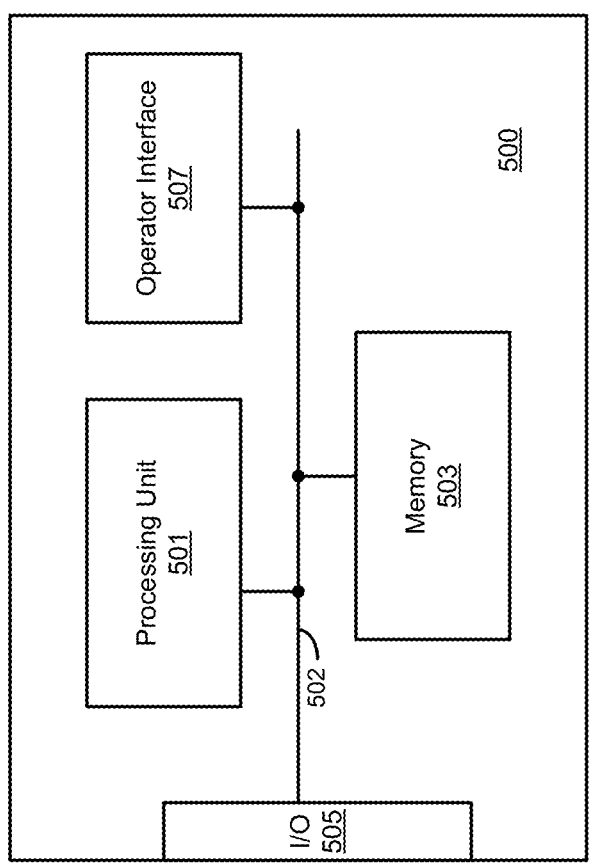
FIG. 5 illustrates a generalized embodiment of a computing system 500 that may be used to execute the file-attendant messaging operations described herein.

FIG. 5 illustrates a generalized embodiment of a computing system 500 (e.g., laptop computer, smartphone, or other appliance, system or device) for executing the file-attendant messaging operations described above. As shown, computing system 500 includes a processing unit 501 formed by one or more general purposes or special purpose processors, memory 503 for storing program code executed by the processing unit to effect the various methods and techniques of the above-described embodiments, and also to store files or other shared resources to which messages are attached.

The computing system further includes one or more input and/or output (I/O) ports 505 for receiving and outputting data (files and/or other shared resources, and associated messages), and a user interface 507 to present and receive information to a human or artificial operator and thus enable operator control of the message-attendant function (e.g., set configuration, programmable values, etc.) as well as to interact with the computing system in a manner intended by its core function. Though not shown, numerous other functional blocks may be provided within the computing system and the computing system itself may be a component in a network of computing systems. Further, the functional blocks are depicted as being coupled by a communication path 502 which may include any number of shared or dedicated buses or signaling links. More generally, the functional blocks shown may be interconnected in a variety of different architectures and individually be implemented by a variety of different underlying technologies and architectures. With regard to the memory architecture, for example, multiple different classes of storage may be provided within memory 503 to store different classes of data. For example, non-volatile storage media such as fixed or removable magnetic, optical, or semiconductor-based recording media may be provided to store executable code and related data (or receivable within such system to enable receipt of such executable code and related data), while volatile storage media such as static or dynamic RAM for storing variable data.

The various file-attendant messaging methods and techniques disclosed herein may be implemented through execution of one or more a sequences of instructions (i.e., software program(s)) within the processing unit 501, or by a custom-built hardware ASIC (application-specific integrated circuit), or programmed on a programmable hardware device such as an FPGA (field-programmable gate array), or any combination thereof.

Any of the various methodologies disclosed herein and/or user interfaces for configuring and managing same may be implemented by machine execution of one or more sequences instructions (including related data necessary for proper instruction execution). Such instructions may be recorded on one or more computer-readable media for later retrieval and execution within one or more processors of a special purpose or general purpose computer system or consumer electronic device or appliance, such as the system, device or appliance described in reference to FIG. 5. Computer-readable media in which such instructions and data may be embodied include, but are not limited to, non-volatile storage media in various forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

In the foregoing description and in the accompanying drawings, specific terminology and drawing symbols have been set forth to provide a thorough understanding of the present invention. In some instances, the terminology and symbols may imply specific details that are not required to practice the invention.

While the invention has been described with reference to specific embodiments thereof, it will be evident that various modifications and changes may be made thereto without departing from the broader spirit and scope. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of enabling communications with respect to a synchronized data file within a networked computing system, the method comprising:
    receiving, within in a first computing device in the networked computing system, user-input specifying a revision to a section of a data file and user-input specifying closure of the data file;
    in response to the user-input specifying closure of the data file, identifying one or more other computing devices within the networked computing system in which the data file is to be synchronized and prompting a user of the first computing device to specify a message to be communicated to the one or more other computing devices in association with the revised section of the data file;
    receiving the message specified by the user of the first computing device; and
    communicating the message to the one or more other computing devices together with information that enables the revision to the section of the data file to be synchronized within the one or more other computing devices.

2. The method of claim 1 wherein receiving the user-input specifying the revision to the section of the data file comprises receiving user-input that specifies a particular feature or point in the data file.

3. The method of claim of claim 1 wherein receiving the user-input specifying the revision to the section of the data file comprises receiving user-input that specifies a page in a multi-page data file.

4. The method of claim 1 wherein prompting the user of the first computing device to specify a message to be communicated to the one or more other computing devices in association with the revised section of the data file comprises prompting the user of the first computing device to enter a comment that is to be connected to a particular feature or point in the data file.

5. The method of claim 4 wherein communicating the message to the one or more other computing devices comprises communicating the comment to the one or more other computing devices to enable the comment to be viewed in connection with the revised section of the data file.

6. The method of claim 1 wherein identifying one or more other computing devices within the networked computing system in which the data file creation/revision is to be synchronized comprises retrieving stored information associated with the data file, the stored information including identifiers of the one or more other computing devices.

7. The method of claim 1 wherein identifying one or more other computing devices within the networked computing system in which the data file creation/revision is to be synchronized comprises retrieving stored information associated with the data file, the stored information including account information indicating one or more user accounts associated with the one or more other computing devices and instances of the data file stored within the one or more other computing devices in association with the one or more user accounts.

8. The method of claim 7 wherein retrieving stored information associated with the data file comprises retrieving the stored information from a network-based file sharing system.

9. The method of claim 1 wherein communicating the message to the one or more other computing devices together with the information that enables the data file creation/revision to be synchronized comprises communicating the message and information to the one or more other computing devices via a network communication system of the networked computing system.

10. The method of claim 1 further comprising instructing the one or more other computing devices to display respective file message synchronization notifications containing the message from the first computing device, each file message synchronization notification including a filename of the data file.

11. The method of claim 10 further comprising instructing each of the one or more other computing devices to display contents of the data file in conjunction with the file message synchronization notification.

12. The method of claim 10 wherein instructing the one or more other computing devices to display respective file message synchronization notifications comprises instructing each of the one or more other computing devices to display a respective file message synchronization notification that includes a prompt to a user of the computing device on which the file message synchronization notification is displayed, the prompt inviting the user of the computing device to enter a responsive message regarding the data file.

13. The method of claim 12 further comprising receiving the responsive message and communicating the responsive message to at least the first computing device together within an instruction to display the responsive message to the user of the first computing device.

14. A system for enabling communications with respect to a synchronized data file within a computer network, the system comprising:
    one or more processors; and
    memory to store program code which, when executed by the one or more processors, causes the one or more processors to:
        receive, within in a first computing device in the networked computing system, user-input specifying a revision to a section of a data file and user-input specifying closure of the data file;
        in response to the user-input specifying closure of the data file,
            identify one or more other computing devices within the networked computing system in which the data file is to be synchronized, and
            prompt a user of the first computing device to specify a message to be communicated to the one or more other computing devices in association with the revised section of the data file;
        receive the message specified by the user of the first computing device; and communicate the message to the one or more other computing devices together with information that enables the revision to the section of the data file to be synchronized within the one or more other computing devices.

15. The system of claim 14 wherein the program code which, when executed by the one or more processors, causes the one or more processors to receive the user-input specifying the revision to the section of the data file comprises program code which, when executed, causes the one or more processors to receive user-input that specifies a particular feature or point in the data file.

16. The system of claim 14 wherein the program code which, when executed by the one or more processors, causes the one or more processors to prompt the user of the first computing device to specify a message to be communicated to the one or more other computing devices in association with the revised section of the data file comprises program code which, when executed, causes the one or more processors to prompt the user of the first computing device to enter a comment that is to be connected to a particular feature or point in the data file.

17. The system of claim 16 wherein the program code which, when executed by the one or more processors, causes the one or more processors to communicate the message to the one or more other computing devices comprises program code which, when executed, causes the one or more processors to communicate the comment to the one or more other computing devices to enable the comment to be viewed in connection with the revised section of the data file.

18. The system of claim 14 wherein the program code which, when executed by the one or more processors, causes the one or more processors to identify one or more other computing devices within the networked computing system in which the data file creation/revision is to be synchronized comprises program code which, when executed, causes the one or more processors to retrieve stored information associated with the data file, the stored information including account information indicating one or more user accounts associated with the one or more other computing devices and instances of the data file stored within the one or more other computing devices in association with the one or more user accounts.

19. The system of claim 18 wherein the program code which, when executed by the one or more processors, causes the one or more processors to retrieve stored information associated with the data file comprises program code which, when executed, causes the one or more processors to retrieve the stored information from a network-based file sharing system.

20. A non-transitory computer-readable medium having program code embodied therein which, when executed by one or more processors within a networked computing system, cause the one or more processors to:
    receive, within in a first computing device in the networked computing system, user-input specifying a revision to a section of a data file and user-input specifying closure of the data file;
    in response to the user-input specifying closure of the data file,
        identify one or more other computing devices within the networked computing system in which the data file is to be synchronized, and
        prompt a user of the first computing device to specify a message to be communicated to the one or more other computing devices in association with the revised section of the data file;
    receive the message specified by the user of the first computing device; and
    communicate the message to the one or more other computing devices together with information that enables the revision to the section of the data file to be synchronized within the one or more other computing devices.

* * * * *